United States Patent
Seita

(10) Patent No.: US 6,973,327 B2
(45) Date of Patent: Dec. 6, 2005

(54) COMMUNICATION MODULE AND COMMUNICATION APPARATUS HAVING SUCH A COMMUNICATION MODULE

(75) Inventor: Kazuhisa Seita, Kanagawa (JP)

(73) Assignee: Sony Corporation, Tokyo (JP)

( * ) Notice: Subject to any disclaimer, the term of this patent is extended or adjusted under 35 U.S.C. 154(b) by 508 days.

(21) Appl. No.: 10/131,327

(22) Filed: Apr. 24, 2002

(65) Prior Publication Data
US 2002/0183094 A1    Dec. 5, 2002

(30) Foreign Application Priority Data

Apr. 25, 2001   (JP)   ............... 2001-126942
Apr. 25, 2001   (JP)   ............... 2001-126979

(51) Int. Cl.[7] ............... H04M 1/00; H04B 1/38
(52) U.S. Cl. ............... 455/550.1; 455/558; 455/575.3; 455/575.5
(58) Field of Search ............... 455/558

(56) References Cited

U.S. PATENT DOCUMENTS

| | | | |
|---|---|---|---|
| 5,983,073 A | * | 11/1999 | Ditzik ............... 455/11.1 |
| 6,556,843 B1 | * | 4/2003 | Okumura ............... 455/558 |
| 6,760,074 B1 | * | 7/2004 | Maruyama et al. ......... 348/375 |
| 2002/0002061 A1 | * | 1/2002 | Miyasaka et al. ............ 455/557 |
| 2003/0199255 A1 | * | 10/2003 | Arisawa ............... 455/108 |

* cited by examiner

Primary Examiner—Rafael Perez-Gutierrez
Assistant Examiner—Marisol Figueroa
(74) Attorney, Agent, or Firm—Frommer Lawrence & Haug LLP; William S. Frommer

(57) ABSTRACT

An IC chip with IC card functions, a contactless IC card antenna, and an antenna connection circuit for connecting the IC chip and the contactless IC card antenna are provided on a mount board, and are combined to form a communication module, thereby making the communication module smaller. The communication module can be mounted on and removed from a mobile phone, thereby making it possible to downsize the mobile phone. Also, because the IC card antenna projects from a rear surface of a chassis of the mobile phone, the distance between the IC card antenna and the LCD panel or the ear receiver can be extended by the amount by which the contactless IC card antenna projects from the rear surface of the chassis, and thus the thickness of the chassis of the mobile phone can be reduced.

10 Claims, 9 Drawing Sheets

FIG.3A
FIG.3B
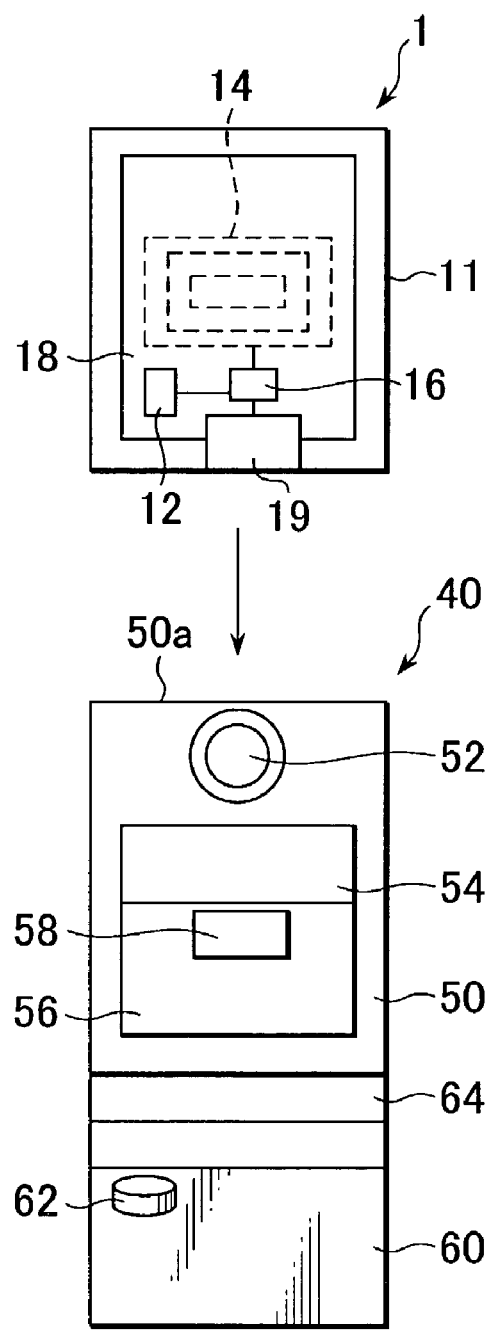
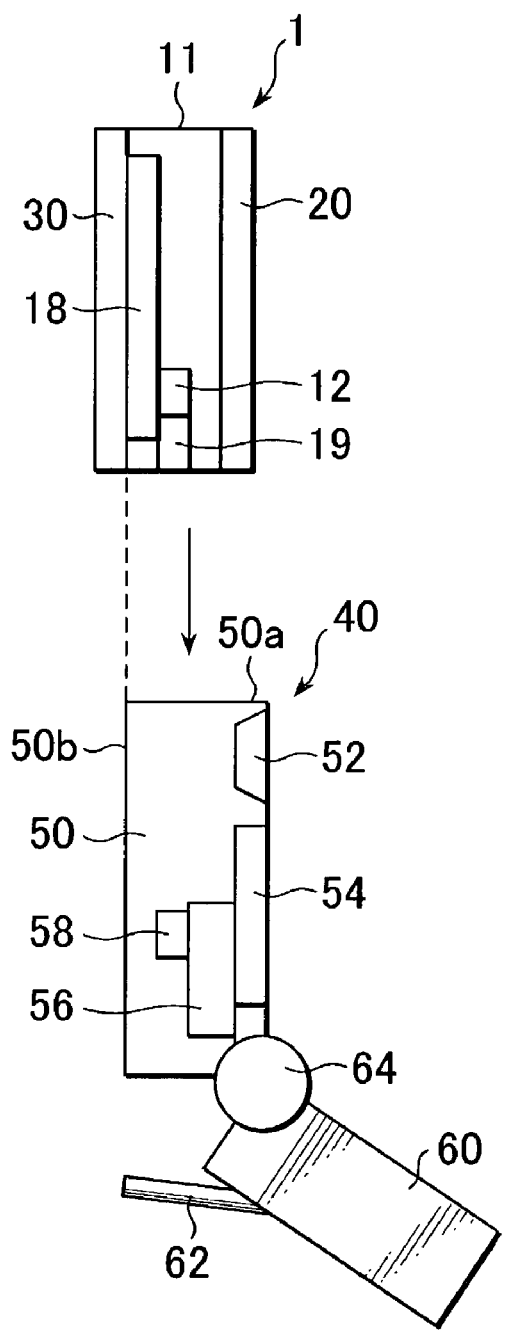

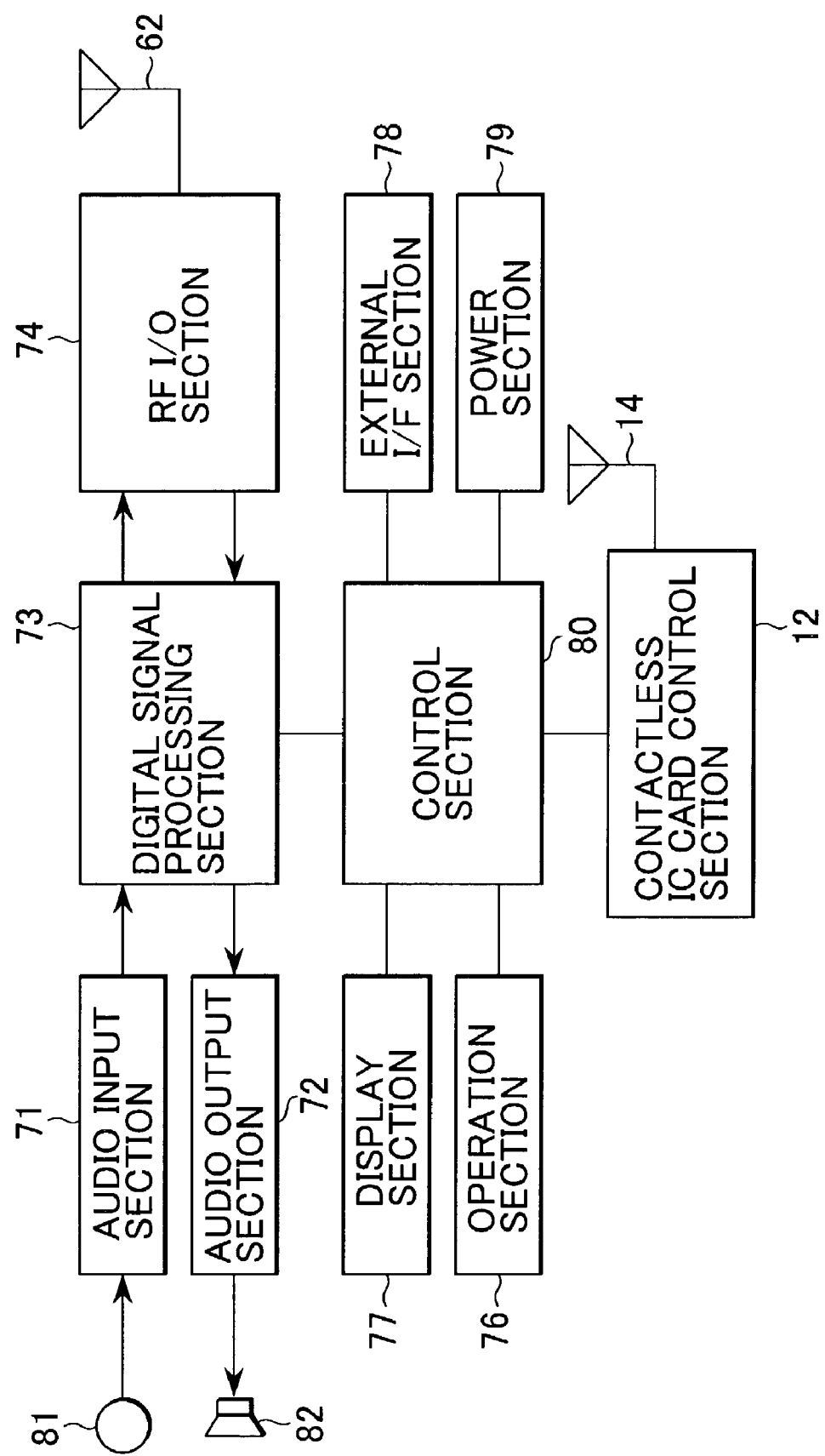

COMMUNICATION MODULE AND COMMUNICATION APPARATUS HAVING SUCH A COMMUNICATION MODULE

CROSS REFERENCE TO RELATED APPLICATIONS

The present document is based on Japanese Priority Document JP 2001-126979 and Japanese Priority Document JP 2001-126942, both filed in the Japanese Patent Office on Apr. 25, 2001, the entire contents of which are incorporated herein by reference to the extent permitted by law.

BACKGROUND OF THE INVENTION

1. Field of the Invention

The present invention relates to the installation of IC card functions to mobile terminals. The present invention also relates to the positioning of an IC card antenna in installing IC card functions to mobile terminals.

2. Description of the Related Art

Attempts have been made at installing contactless IC card functions (including read/write functions), whose standardization is being advanced through ISO14443 and the like, to mobile phones. In so doing, at least an IC chip to perform the contactless IC card functions and an antenna for the IC chip to establish communication with an external R/W (an externally located card reader/writer) must be installed in the mobile phone.

However, adding various circuits to a mobile phone in order to install such functions described above results in the circuit scale becoming larger. Especially since the needs today for downsizing mobile phones are considerable, mounting IC chips and contactless IC card antennae on mobile phones could very well be in opposition to the needs for downsizing. Because various electronic components and IC chips are mounted on circuit boards with high packing density in current mobile phones, mounting additional components must be done with great care in order to meet the needs for downsizing mentioned above.

SUMMARY OF THE INVENTION

An aspect of the present invention is to achieve downsizing of a communication apparatus, such as a mobile phone, when the communication apparatus is installed with IC card functions.

One embodiment of the present invention relates to communication modules. Communication modules according to an embodiment of the present invention has an external communication means, a loop antenna, an antenna connection means and a mount member.

The external communication means communicates with an external communication object. The loop antenna transmits to or receives from the external communication object communication electromagnetic waves which correspond to the contents of such communication with the external communication means. The antenna connection means connects the external communication means and the loop antenna. The external communication means, the loop antenna and the antenna connection means are mounted on the mount member. As such, the external communication means, the loop antenna and the antenna connection means are all mounted on one common mount member.

In an embodiment of the present invention configured as described above, because the external communication means, the loop antenna and the antenna connection means are all mounted on one common mount member, downsizing of the communication module becomes possible.

In an embodiment of the present invention, it is also preferable that a shield member for shielding electromagnetic waves be provided. By way of such a shield member, electromagnetic waves irrelevant to the loop antenna can be shielded, and thus adverse effects of such irrelevant electromagnetic waves on communication can be prevented. The shield member should preferably be positioned face to face with the mount member. By thus having the shield member face the loop antenna, electromagnetic waves that are irrelevant to the loop antenna can be shielded efficiently and effectively.

It is also preferable for an embodiment of the present invention to have a connection means for connecting the communication module with other apparatuses.

Further, the present invention relates to communication apparatuses to which communication modules are installed. In such communication apparatuses, the communication modules are removable. Because the communication modules are removable and thus easily replacable, repair and adjustment can be performed with ease.

In a communication apparatus according to an embodiment of the present invention, it is preferable that the communication module have at least some portion of itself project from a surface of the communication apparatus. By thus having at least a portion of the communication module project from the surface of the communication apparatus, the distance between metal parts of the communication apparatus and the loop antenna can be increased by the amount by which the communication module projects from the surface of the communication apparatus. Therefore, adverse effects on the loop antenna's communication can be prevented.

Preferably, the communication apparatus according to an embodiment of the present invention should further comprise a soft material covering the surface of the loop antenna. Due to the fact that at least some portion of the communication module projects from the surface of the communication apparatus, it is expected that the loop antenna may be hit by some object by accident. However, since the surface of the loop antenna is covered by the soft material, the loop antenna can be prevented from becoming damaged.

This loop antenna, of course, is an antenna for contactless IC cards.

Further, the communication apparatus according to an embodiment of the present invention comprises metal containing sections, and a contactless IC card antenna. The metal containing sections are positioned on a surface of a first chassis. And the contactless IC card antenna projects from a rear surface of the first chassis. The metal containing section mentioned above includes LCD panels, ear receivers and the like.

In the embodiment of the present invention configured as described above, the contactless IC card antenna projects from the rear surface of the first chassis, and thus even if the first chassis is made thin, at least the distance by which the contactless IC card antenna projects from the first chassis is secured as the distance between the contactless IC card antenna and the metal containing sections. Thus, a communication range for the loop antenna can be secured.

Preferably, the communication apparatus according to an embodiment of the present invention should further comprise a telecommunication antenna for communication over ranges larger than that of the contactless IC card antenna and a second chassis to which this telecommunication antenna is attached.

Since the telecommunication antenna is attached to the second chassis, it is therefore attached to a chassis other than the first chassis. Thus, the distance between the telecommunication antenna and the contactless IC card antenna can be made greater, and a communication range for each of these antennae can be secured.

Further, the first chassis and the second chassis of the communication apparatus according to an embodiment of the present invention should be joined in such a manner that they are foldable. In such a case, the contactless IC card antenna should be provided towards an end of the first chassis opposite to the end at which the first chassis and the second chassis are joined. Further, the telecommunication antenna should be provided on the second chassis towards the end connecting the second chassis to the first chassis.

Thus, when the first chassis and the second chassis are folded together, the contactless IC card antenna and the telecommunication antenna are positioned on opposite ends. Therefore, the distance between the telecommunication antenna and the contactless IC card antenna can be made larger, and a communication range for each of these antennae can be secured.

BRIEF DESCRIPTION OF THE DRAWINGS

The above and other aspects, features and advantages of the present invention will become more apparent to those skilled in the art from the following description of the presently preferred exemplary embodiments of the invention taken in conjunction with the accompanying drawings, in which:

FIG. 3A and FIG. 3B are a rear view and a side view, respectively, of a communication module 1 as mounted on a mobile phone 40;

FIG. 6 is a function block diagram of a mobile phone according to an embodiment of the present invention;

FIG. 8B is a side view of a comparative example in which the antenna 14 is built in.

DESCRIPTION OF THE PREFERRED EMBODIMENTS

Figure 1:
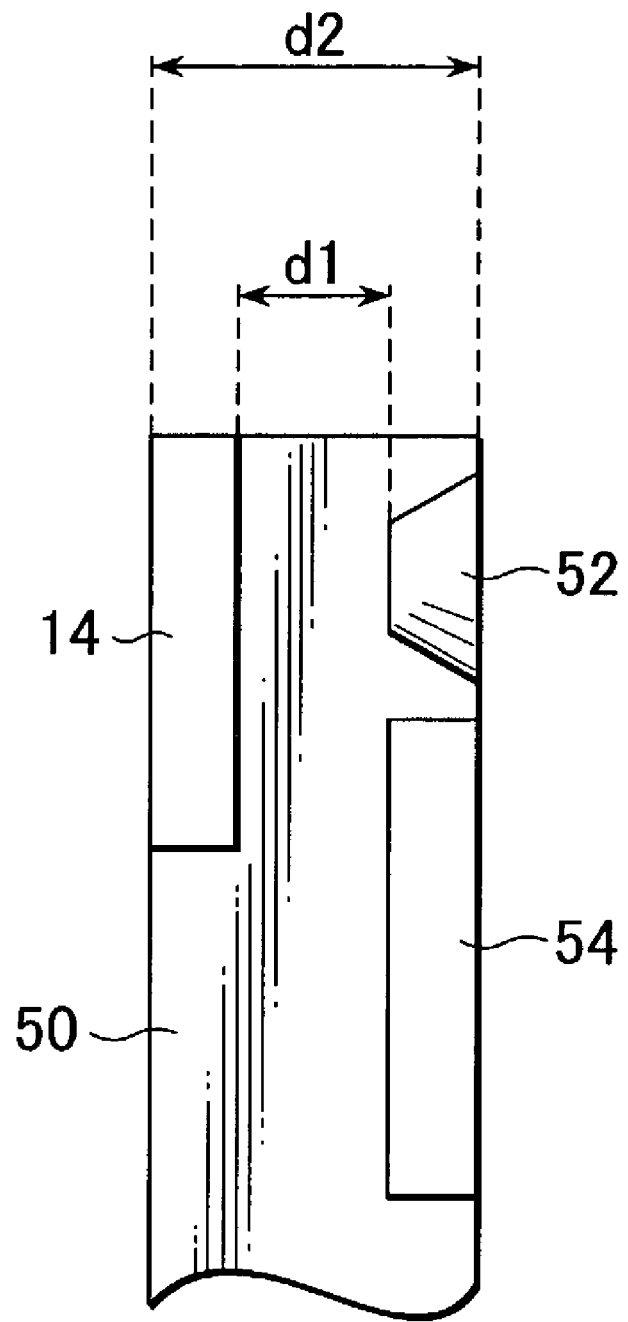
FIG. 1 is a side view of a comparative example to be compared with an embodiment of the present invention.

As already described above, attempts are being made at installing contactless IC card functions (including read/write functions), whose standardization is being advanced through ISO1443 and the like, to mobile terminals. In so doing, it is preferable to position the antenna section of the contactless IC card as close to a surface (rear surface) of the mobile terminal as possible, the reasons for which are explained with reference to FIG. 1. FIG. 1 is a diagram showing the positioning of the antenna section of the contactless IC card wherein the portable terminal is assumed to be a mobile phone. Thus, the example shown in FIG. 1 is not prior art.

On a surface of chassis 50, an LCD panel 54 and an ear receiver 52 are positioned. The LCD panel 54 and the ear receiver 52 both contain metal, and have adverse effects on the antenna section 14 of the contactless IC card. In other words, the communication range of the antenna section 14 of the contactless IC card is compromised. Specifically, when a metal panel is within a magnetic field created by an R/W (an externally located card reader/writer), an eddy current flows through the metal panel. Because this eddy current flows in a direction which cancels the magnetic field created by the R/W, the magnetic field which passes through the antenna section 14 (a loop antenna) decreases, and the voltage obtained by the contactless IC card decreases. Further, when the magnetic field created by the R/W passes through the inside of the antenna section 14, a current flows through the antenna section 14 in a direction which cancels the magnetic field. When the metal panel is inside a magnetic field caused by the antenna section 14, by the same principles as those described above, an eddy current flows through the metal panel in a direction which cancels the magnetic field caused by the antenna section 14, and thus the amount of current flowing through the antenna section 14 decreases.

In view of what is described above, it can be understood that in order to secure a stable communication range for the antenna section 14 of the contactless IC card in the example shown in FIG. 1, a distance d1 between the antenna section 14 of the contactless IC card and the LCD panel 54 or the ear receiver 52 must be set as far apart as possible. Specifically, by positioning the antenna section 14 of the contactless IC card close to a surface opposite the surface of the chassis 50 on which the LCD panel 54 and the like are positioned, a greater distance for d1 can be secured.

However, in order to extend d1, a thickness d2 of the chassis 50 must be increased, and thus comes in clear opposition to the needs for thinner and smaller mobile phones.

For this reason, the present invention seeks to meet the needs for thinner and smaller mobile phones in the manner described below.

In the following paragraphs, the preferred embodiments of the present invention are described in detail with reference to the accompanying drawings.

<First Embodiment>

Figure 2A:
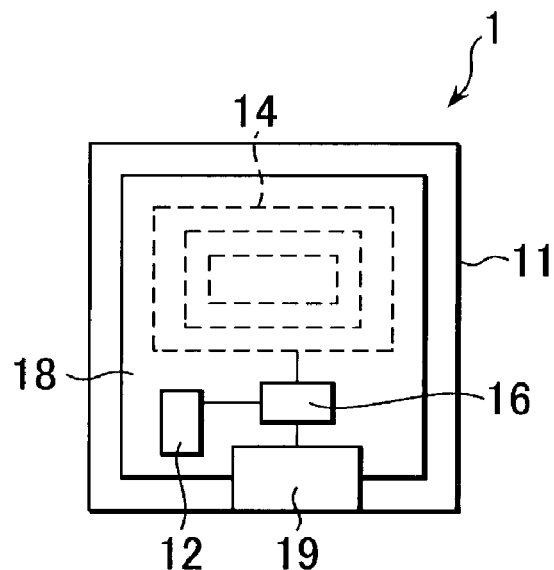
FIG. 2A and FIG. 2B are a rear view and a side view, respectively, of a communication module according to an embodiment of the present invention.
Figure 2B:
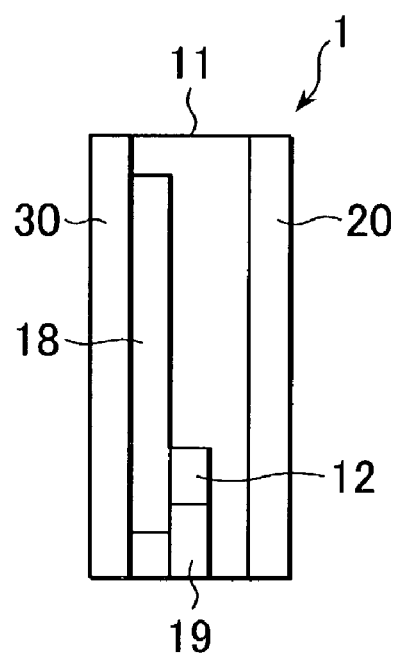

FIG. 2A and FIG. 2B are a rear view and a side view, respectively, of a communication module according to a first embodiment of the present invention. A communication module 1 comprises a package case 11, an IC chip 12 (an external communication means which operates as a contactless IC card control section), a contactless IC card antenna 14, an antenna connection circuit 16, a mount board 18, a connector 19 (a connection means), a shield member 20 and a rubber member 30.

The package case 11 is a protective casing for the mount board 18.

The IC chip 12 is provided to communicate with a communication object external to the communication module 1 such as an R/W, cards and the like. Further, in this embodiment of the present invention, the IC chip 12 is configured to possess functions of a contactless IC card whose standardization is being advanced through ISO14443 and the like. Also, the IC chip 12 may have functions other than communicating with communication objects external to the communication module 1. The IC chip 12 is positioned on the mount board 18.

The contactless IC card antenna 14 is an antenna for transmitting to or receiving from an external communication object (an external R/W, cards and the like) communication electromagnetic waves corresponding to the contents of the communication by the IC chip 12. The contactless IC card antenna 14 is mounted on the mount board 18 as a print-pattern. Also, the contactless IC card antenna 14 is used for communication over a communication range of several centimeters, and needs to be held close to or briefly contacted with an external communication object.

The antenna connection circuit 16 is a circuit which connects the IC chip 12 and the contactless IC card antenna 14. The antenna connection circuit 16 is mounted on the mount board 18.

The mount board 18 is provided to integrate the IC chip 12, the contactless IC card antenna 14 and the antenna conncection circuit 16. In other words, the IC chip 12, the contactless IC card antenna 14 and the antenna connection circuit 16 are all mounted on the mount board 18.

The connector 19 connects the connection module 1 and a mobile phone 40 which is later described. The connector 19 may supply the communication module 1 with power provided from the mobile phone 40. Also, data and control signals may be communicated between the communication module 1 and a control section (CPU) of the mobile phone 40 via the connector 19.

The shield member 20 is there to shield electromagnetic waves. The shield member 20 may be some conductive paint coating, metal plates or the like. The shield member 20 is provided so as to face the mount board 18. Being thus provided, electromagnetic waves irrelevant to the contactless IC card antenna 14 on the mount board 18 can be shielded. Specifically, when the communication module 1 is connected to the mobile phone 40, electromagnetic waves caused by the metal parts of the mobile phone 40 can be shielded. Thus, mutual interference (effects) between the communication module 1 and the mobile phone 40 can be minimized.

The rubber member 30 is a soft material covering the surface of the contactless IC card antenna 14. It is made of some rubber type material. Or alternatively, it may be made of a soft resin having cushioning properties. Also, for the construction of the rubber member 30, pasting a rubber type sticker is one possible alternative. Further, the package case 11 may be encased in whole or in part by a rubber type resin or the like.

FIG. 3A and FIG. 3B are a rear view and a side view, respectively, of the communication module 1 as mounted on the mobile phone 40. However, in FIG. 3A, a first chassis 50 of the mobile phone 40 is shown with a rear surface 50b of the first chassis 50 removed. The communication module 1 can be used while mounted on the mobile phone 40. However, the use of the communication module 1 is not limited to mobile phones, and may be used with mobile terminals such as PDA's and the like.

The mobile phone 40 has the first chassis 50, and a second chassis 60. The first chassis 50 comprises the ear receiver 52, the LCD panel 54, a junction circuit board 56 and a connector 58.

The ear receiver 52 is used for hearing sounds by having it held around the ear of a mobile phone user, and contains metal. The LCD panel 54 displays text, images and the like to the mobile phone user, and also contains metal. The ear receiver 52 and the LCD panel 54 are positioned on a surface of the first chassis 50.

The junction circuit board 56 relays electrical power from a power source and control signals from a control section, and splits them between the ear receiver 52, the LCD panel 54 and the communication module 1. The junction circuit board 56 is built into the first chassis 50. The connector 58 connects the junction circuit board 56 and the connector 19 of the communication module 1.

The second chassis 60 is connected to the first chassis 50, and has a telecommunication antenna 62. The telecommunication antenna 62 is provided to perform communication as a mobile phone.

The communication module 1 is inserted into the first chassis 50 from a top surface 50a of the first chassis 50 by being moved in the direction indicated by the arrow shown in FIG. 3. In so doing, the connector 19 of the communication module 1 and the connector 58 of the first chassis become connected. Also, the communication module 1 projects from the rear surface 50b of the first chassis 50. Thus, the distance between the contactless IC card antenna 14 of the communication module 1 and the ear receiver 52 and electronic circuits of the LCD panel 54 of the mobile phone 40, both of which contain metal, can be maximized, thereby reducing the effects of the metal on the magnetic field. The direction indicated by the arrow shown in FIG. 3, however, is only an example of an insertion direction, and the communication module 1 may be inserted from other directions, or from the rear surface 50b. Also, by moving the communication module 1 in the direction opposite to that shown by the arrow in FIG. 3, the communication module 1 can be removed from the mobile phone 40.

Figure 4A:
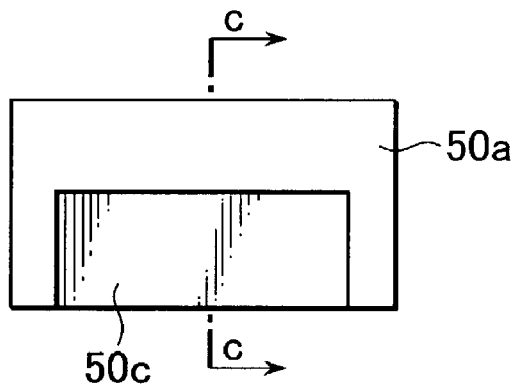
FIGS. 4A-4C are a plan view, a rear view and a cross-sectional view through section c—c of FIG. 4A, respectively, of a section of a chassis 50 towards its upper section.
Figure 4B:
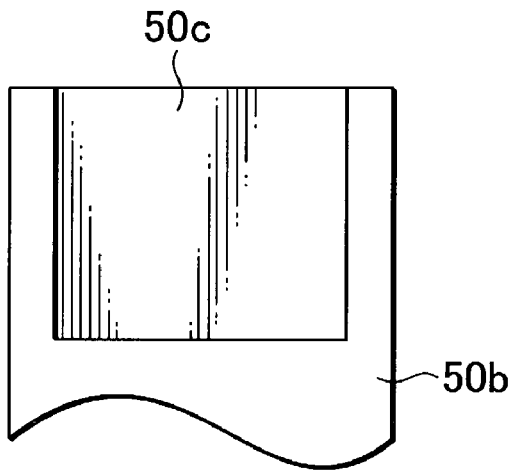
Figure 4C:
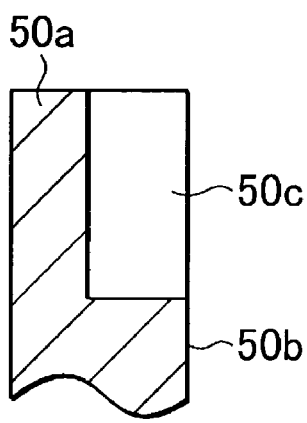

FIG. 4A~FIG. 4C are a plan view, a rear view and a cross sectional view, respectively, of the top surface 50a, and its surroundings, of the first chassis 50. On the top surface 50a of the first chassis 50, there is provided a notch 50c, into which the communication module 1 is insertable. Also, the notch 50c extends to the rear surface 50b (see FIG. 4B), and the communication module 1 projects from the rear surface 50b from the notch 50c.

Figure 5A:
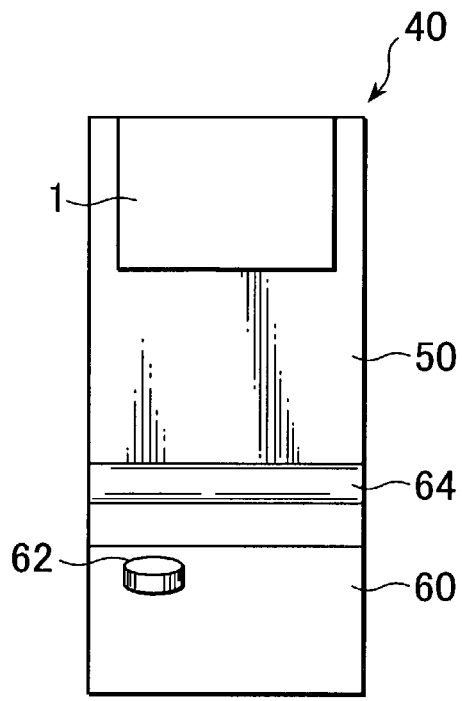
FIG. 5A and FIG. 5B are a rear view and a side view, respectively, of the communication module 1 as mounted on the mobile phone 40.
Figure 5B:
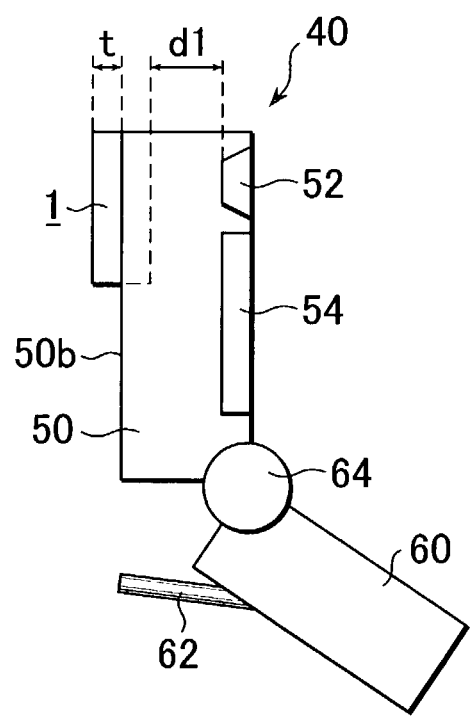

FIG. 5A and FIG. 5B are a rear view and a side view, respectively, of the communication module 1 as mounted on the mobile phone 40. At least part of the communication module 1 projects from the rear surface 50b of the first chassis 50. A distance d1 between the communication module 1 and the ear receiver 52 and the LCD panel 54 can be increased by a distance t by which the communication module 1 projects from the rear surface 50b.

Below, the operations of the first embodiment of the present invention are described.

First, the communication module 1 is inserted into the notch 50c provided on the top surface 50a of the first chassis 50. In other words, the communication module 1 and the mobile phone 40 are separate objects. Thus, adjustments on the antenna matching of the contactless IC card antenna 14 can be performed independent of any interference by the metal parts (the ear receiver 52, the LCD panel 54 and the like) of the mobile phone 40, thereby making adjustments much easier to perform.

When the communication module 1 is inserted as described above, the connector 19 of the communication module 1 and the connector 58 of the first chassis 50 are connected. At least part of the communication module 1 projects from the rear surface 50b of the first chassis 50. Further, the shield member 20 is positioned between the contactless IC card antenna 14 and the ear receiver 52 and the LCD panel 54. Thus, irrelevant electromagnetic waves from the ear receiver 52 or the LCD panel 54 can be prevented from being sensed by the contactless IC card antenna 14.

In order to have the mobile phone 40 perform functions of a contactless IC card, the contactless IC card antenna 14 is brought within a range between several centimeters to ten several centimeters from an external R/W, or is briefly contacted with an external R/W. During this event, because part of the communication module 1 projects from the rear surface 50b of the first chassis 50, the contactless IC card antenna 14 can be located easily.

On the other hand, because part of the communication module 1 projects from the rear surface 50b of the first chassis 50, the communication module 1 may collide with an external R/W by accident. This physical impact will reach the mobile phone 40 and may cause it to break down. Or, with recent mobile phones with smooth surface finishings, the surface could be marred. However, by having the surface of the contactless IC card antenna 14 covered with the rubber member 30, the impact can be mitigated, while at the same time preventing any damage.

By holding the contactless IC card antenna 14 close to an external R/W, the IC chip 12 communicates with that external R/W. If, during such a communication, there is metal in close proximity to the contactless IC card antenna 14, communication is adversely affected. Parts in a mobile phone containing metal are, for example, the ear receiver 52 and the LCD panel 54.

In this embodiment of the present invention, because part of the communication module 1 projects from the rear surface 50b of the first chassis 50, the distance d1 between the communication module 1 and the ear receiver 52 or the LCD panel 54 can be made bigger. A case where, as in the example shown in FIG. 1, the communication module 1 is built into the first chassis 50 is compared with an embodiment of the present invention shown in FIG. 5A and FIG. 5B. In the comparative example shown in FIG. 1, the distance d1 between the communication module 1 and the ear receiver 52 and the like is reduced by an amount dictated by the thickness of the communication module 1. In FIG. 5B, the distance d1 can be extended by an amount corresponding to the distance t by which the communication module 1 projects from the rear surface 50b of the first chassis 50.

Further, in the event that the communication module 1 of an embodiment of the present invention breaks down or fails to function, the communication module 1 can be removed from the mobile phone 40. Thus, repair of the communication module 1 is made easy.

According to the first embodiment of the present invention, because the IC chip 12, the contactless IC card antenna 14 and the antenna connection circuit 16 are mounted on the mount board 18, the communication module 1 can be made smaller.

Also, the shield member 20 is placed face to face with the mount board 18. Thus, when the communication module 1 is mounted on the mobile phone 40, the shield member 20 comes between the contactless IC card antenna 14 and the ear receiver 52 and the LCD panel 54. Therefore, irrelevant electromagnetic waves from the ear receiver 52 and the LCD panel 54 can be prevented from being sensed by the contactless IC card antenna 14.

Because the mobile phone 40 has metal parts such as the ear receiver 52 and the LCD panel 54, in such cases where the mobile phone 40 and the contactless IC card 14 are provided together and not separately, adjustments on the contactless IC card antenna such as antenna matching is difficult. However, in an embodiment of the present invention, the communication module 1 is mountable by insertion or by any other appropriate method. Therefore, adjustments on the contactless IC card antenna 14 of the communication module 1, such as antenna matching, can be performed before mounting the communication module 1 onto the mobile phone 40, and thus adjusting the communication module 1 is easy.

Further, In such cases where the mobile phone 40 and the contactless IC card 14 are provided together and not separately, repair or replacements in the event that the communication module 1 breaks down means the whole apparatus of the mobile phone 40 needs to be submitted, and results in the inconvenience of not being able to use the mobile phone 40 during repair, and also results in increased replacement costs. However, in an embodiment of the present invention, the communication module 1 can be removed from the mobile phone 40. Therefore, repair and replacement of the communication module 1 can easily be done.

Furthermore, because part of the communication module 1 projects from the rear surface 50b of the first chassis 50, the distance between the communication module 1 and the ear receiver 52 or the LCD panel 54 can be extended. Thus, the mobile phone 40 can be made thinner.

However, because part of the communication module 1 projects from the rear surface 50b of the first chassis 50, there is the possibility that the communication module 1 collides with an external R/W and the like by accident. However, because the rubber member 30 covers the surface of the contactless IC card antenna 14, the mobile phone 40 can be made resistant to such impact, and any damage to the surface of the mobile phone 40 can be prevented.

According to an embodiment of the present invention, because the external communication means, the antenna and the antenna connection means are provided on a common mount member, downsizing of the communication module can be achieved.

<Second Embodiment>

In explaining a second embodiment of the present invention, a mobile phone is again taken as an example of a mobile terminal. However, the present invention can be applied to other mobile terminals such as PDA's (Personal Digital Assistants), and its application is not limited to mobile phones. Further, the mobile phone may take any form, be it foldable, non-foldable, or any other shape. In the drawings, circuits and means which are equivalent to those explained in the first embodiment are identified with the same reference numerals.

A mobile phone according to an embodiment of the present invention is installed with contactless IC card functions, and is characteristic in its positioning of a contactless IC card antenna. However, before explaining the positioning of the contactless IC card antenna, the functional configuration of the mobile phone is explained with reference to a function block diagram for the mobile phone.

FIG. 6 is a function block diagram for a mobile phone according to an embodiment of the present invention. The mobile phone according to an embodiment of the present invention comprises a microphone 81, a speaker 82, an audio input section 71, an audio output section 72, a digital signal processing section 73, an RF (Radio Frequency) I/O (input/output) section 74, a telecommunication antenna 62, a control section 80, an operation section 76, a display section 77, an external I/F section 78, a power section 79, a contactless IC card control section 12 and a contactless IC card antenna 14.

The audio input section 71 converts the analog audio signals from the microphone 81 to digital signals. The audio input section 71 comprises a microphone amplifier, a filter and an A/D converter. The audio output section 72 receives digital audio signals and outputs them as audio by driving the speaker 82. The audio output section 72 comprises a D/A converter, a filter and a power amplifier.

The digital signal processing section 73 performs encoding of digital audio signals and decoding to digital audio signals. The digital signal processing section 73 comprises specialized circuits, mainly DSP's, for performing convolution encoding, slot interleaving, delay detection, convolution decoding and the like.

The RF (Radio Frequency) I/O section 74 performs reception and transmission of high frequency waves. The RF I/O section 74 comprises a quadrature modulator, a gain amplifier, a power amplifier, a diversity, a mixer and an IF modulator. The telecommunication antenna 62 transmits RF signals transmitted from the RF I/O section 74, or it receives RF signals and transmits them to the RF I/O section 74. The telecommunication antenna 62 is used for communication over ranges larger than that of the contactless IC card antenna which is described later.

The control section 80 is a control section which enables mobile phone functions, and comprises a CPU, an EEPROM, a Flash ROM, an SRAM and the like.

The operation section 76 corresponds to keyboards, jog dials, joy sticks and the like. The display section 77 comprises an LCD driver and an LCD display device. The external I/F section 78 comprises a communication interface circuit and a 16-pin connector. The power section 79 comprises a power circuit which uses a battery power source to generate and provide electric power to each block or section, a recharge circuit for the battery and an over current/over voltage protection circuit.

The contactless IC card control section 12 should usually be an integrated circuit, and data transactions are controlled by the control section 80.

The contactless IC card antenna 14 is used to commiunicate with an external R/W, or to exchange data with an external card by having the contactless IC card control section 12 itself become an R/W. This contactless IC card antenna 14 is mounted as close to the surface of the mobile terminal as is possible. The contactless IC card antenna 14 is normally used to communicate by being held close to or by briefly contacting an external R/W or an external card.

Figure 7A:
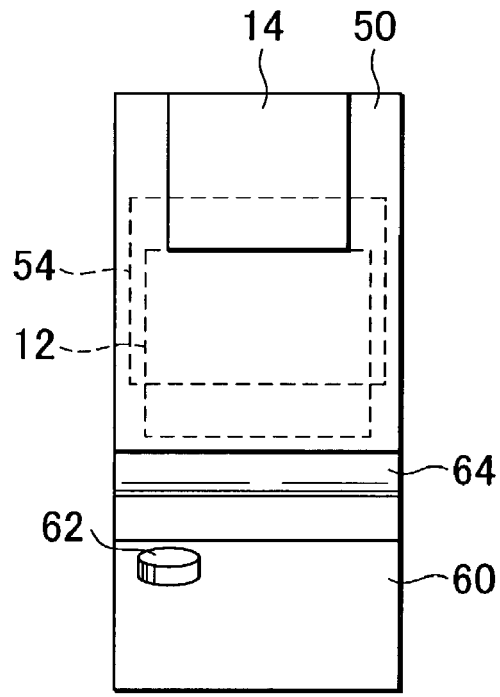
FIG. 7A and FIG. 7B are a rear view and a side view, respectively, of a mobile phone according to an embodiment of the present invention.
Figure 7B:
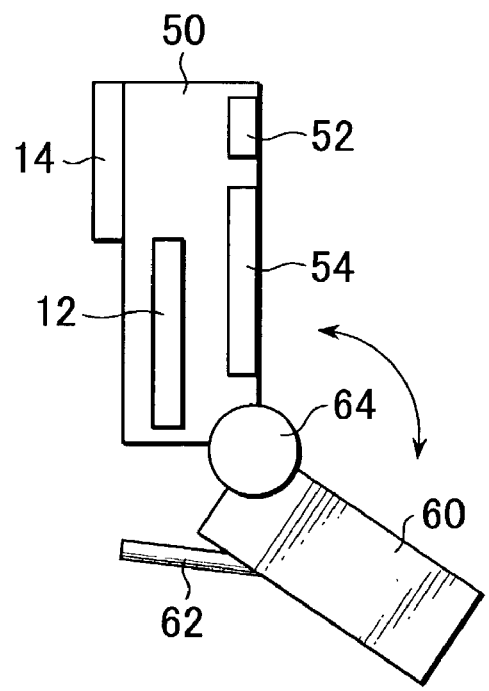

Below, sections which characterize an embodiment of the present invention are described. FIG. 7A and FIG. 7B are a rear view and a side view, respectively, of a mobile phone according to an embodiment of the present invention. This embodiment of the present invention comprises a first chassis 50, a second chassis 60 and a hinge section 64. The first chassis 50 and the second chassis 60 are connected by the hinge section 64 so as to be foldable. In other words, a mobile phone according to this embodiment of the present invention can be opened and closed in the direction indicated by the arrow shown in FIG. 7B.

The first chassis 50 comprises an LCD panel 54, an ear receiver 52, a contactless IC card control section 12 and a contactless IC card antenna 14.

The LCD panel 54 is a panel for displaying text and images to the mobile phone user, and contains metal. The LCD panel 54 is positioned on a surface of the first chassis 50. The ear receiver 52 is used to listen to sounds by having it held close to the mobile phone user's ear, and contains metal. The ear receiver 52 is also positioned on the surface of the chassis 50 on which the LCD panel 54 is positioned. The LCD panel 54 and the ear receiver 52 may also be identified as metal containing sections which contain metal.

The contactless IC card control section 12 is there to make the mobile phone function as a contactless IC card. The contactless IC card control section 12 is built into the first chassis 50.

The contactless IC card antenna 14 is an antenna used in order for the contactless IC card control section 12 to communicate. The communication range of the contactless IC card antenna 14 is very short, normally falling between several centimeters to ten several centimeters. Therefore, for communication using the contactless IC card antenna 14, it is preferable that the contactless IC card antenna 14 briefly contact or be held close to a communication object. Further, the contactless IC card antenna 14 is, for example, a loop antenna, and is configured with a print circuit board or a flexible board.

The contactless IC card antenna 14 is provided in a manner such that it projects from a rear surface of the first chassis 50. By the terms rear surface, it is meant a surface which is opposite to the surface on which the LCD panel 54 and the ear receiver 52 are provided on the first chassis 50.

The contactless IC card 14 or its surface formed with a soft material. The soft material may be rubber type materials or resins having cushioning properties. In forming the surface of the contactless IC card antenna 14 with a soft material, methods of manufacture such as sticking a sticker made of a soft material on the contactless IC card antenna 14, sticking a panel made of a soft material on the contactless IC card antenna 14 and the like may be considered.

The contactless IC card antenna 14 is positioned towards an end of the first chassis opposite the end on which the hinge section 64 is located, and is thus far apart from the hinge section 64.

The second chassis 60 comprises a telecommunication antenna 62. The telecommunication antenna 62 is an antenna which can be used for communication over more distant ranges compared to that of the contactless IC card antenna 14. The telecommunication antenna 62 is used when performing communication as a mobile phone. The telecommunication antenna 62 is positioned towards the same end of the second chassis 60 on which the hinge section 64 is located, and is thus positioned close to the hinge section 64.

Below, operations of the second embodiment of the present invention are described.

In order to make the mobile phone function as a contactles IC card, the contactless IC card antenna 14 is held within a range of several centimeters to ten several centimeters from or is briefly contacted with an external R/W or an external card. Because the contactless IC card antenna 14 projects from the rear surface of the first chassis 50, the contactless IC card antenna 14 can be located easily.

However, because the contactless IC card antenna 14 projects from the rear surface of the first chassis 50, there is also the danger that the contactless IC card antenna 14 becomes accidentally hit by an external R/W and the like. Or, with current mobile phones having smooth surface finishings, the surface could become marred. However, because the contactless IC card antenna 14 or its surface is formed with a soft material, it is made more resistant to such impact, and any damage to the surface can be prevented.

By holding the contactless IC card antenna 14 close to an external R/W and the like, the contactless IC card control section 12 communicates with the external R/W and the like.

If a metal is present in close range with the contactless IC card antenna 14 during this event, communication is adversely affected. Parts containing metal in the mobile phone is, for example, the LCD panel 54, the ear receiver 52 and the telecommunication antenna 62.

Figure 8A:
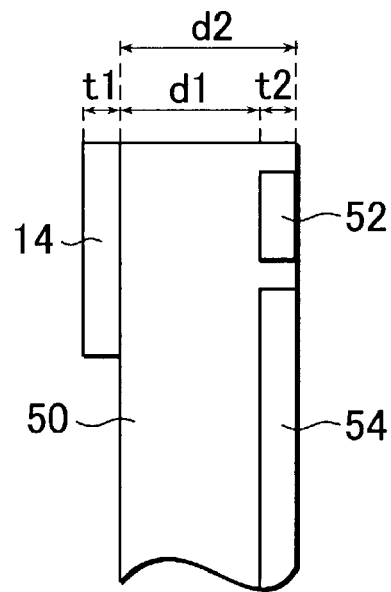
FIG. 8A is an enlarged side view of a mobile phone showing an area close to an antenna 14.

By having the contactless IC card antenna 14 project from the rear surface of the first chassis 50, such adverse effects on communication by the LCD panel 54 and the ear receiver 52 can be prevented, the reason for which is explained with reference to FIG. 8A and FIG. 8B. FIG. 8A is an enlarged side view of a mobile phone showing the contactless IC card antenna 14 and its surroundings. The distance d1 between the contactless IC card antenna 14 and the LCD panel 54 or the ear receiver 52 is d1=d2−t2. Here, d2 is the thickness of the first chassis 50, and t2 is the thickness of the LCD panel 54 or the ear receiver 52. Because the contactless IC card antenna 14 projects from the rear surface of the first chassis 50, the distance between the contactless IC card antenna 14 and the LCD panel 54 or the ear receiver 52 can be extended by an amount corresponding to t1 which is the thickness of the contactless IC card antenna 14.

Figure 8B:
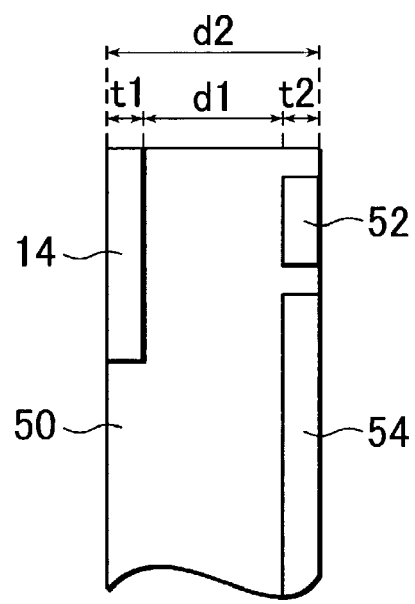

This becomes more salient when compared to a comparative example shown in FIG. 8B where the contactless IC card antenna 14 is built inside the mobile phone. In FIG. 8B d1=d2−t2−t1. In other words, in the second embodiment of the present invention, d1 is extended by t1 compared to the comparative example shown in FIG. 8B. The bigger the distance d1, the better the adverse effects on communication by the LCD panel 54 and the ear receiver 52 can be prevented.

Thus, by having the contactless IC card antenna 14 project from the rear surface of the first chassis 50, adverse effects on communication by the LCD panel 54 and the ear receiver 52 can be prevented. Further, compared to the configuration shown in FIG. 8B, provided the distance d1 is the same, the thickness d2 of the first chassis 50 can be decreased by t1.

Also, by providing the contactless IC card antenna 14 on the first chassis 50, and providing the telecommunication antenna 62 on the second chassis 60, adverse effects on communication by the telecommunication antenna 62 can be prevented. This is because the contactless IC card antenna 14 and the telecommunication antenna 62 can be distanced further apart.

Figure 9:
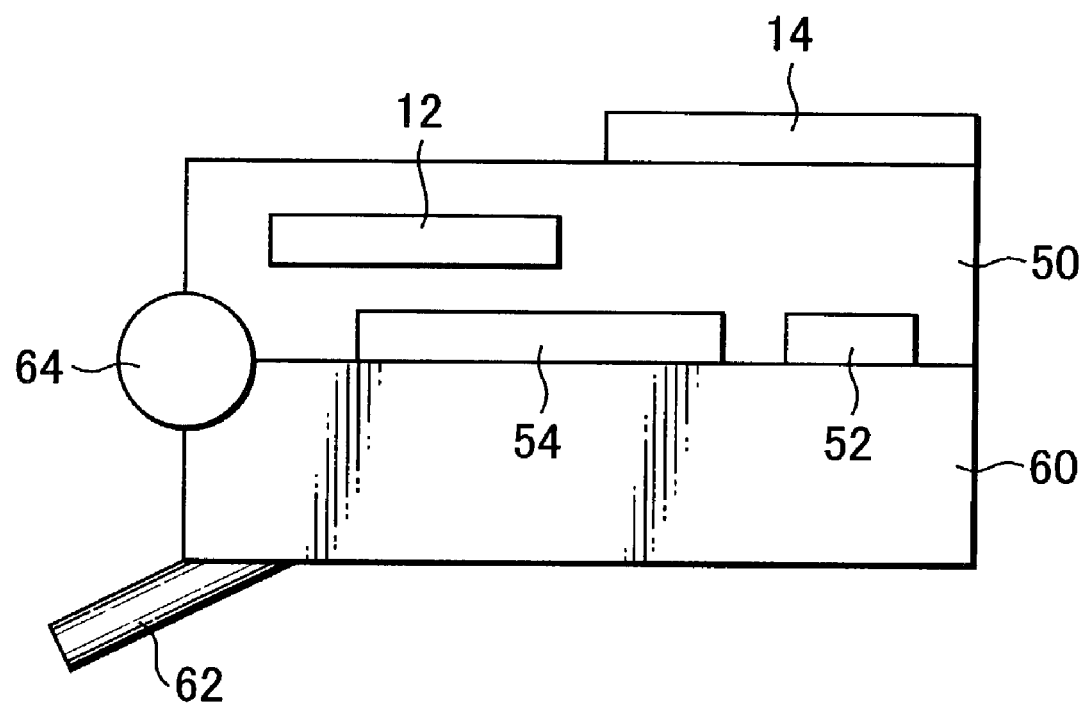
FIG. 9 shows a side view of a mobile phone as folded in the direction indicated by the arrow in FIG. 7B.

Relative positions of the contactless IC card antenna 14 and the telecommunication antenna 62 are described with reference to FIG. 9. FIG. 9 shows the mobile phone as folded in the direction indicated by the arrow shown in FIG. 7B. The profile of the mobile, as folded, becomes approximately rectangular, and the contactless IC card antenna 14 and the telecommunication antenna 62 become positioned towards diagonally opposing corners, and are thus far apart from each other. Therefore, adverse effects on communication by the telecommunication antenna 62 can be prevented. In other words, by so positioning these two elements, mutual interference of electric waves which may arise between the telecommunication antenna 62 and the contactless IC card antenna 14 can be minimized.

According to an embodiment of the present invention, because the contactless IC card antenna 14 projects from the rear surface of the first chassis 50, even if the first chassis 50 is thin, the distance d1 between the contactless IC card 14 and the LCD panel or the ear receiver 52 can be extended by the amount t1 by which the contactless IC card antenna 14 projects itself. Thus, a communication range for the contactless IC card antenna 14 can be secured.

As a result of having the contactless IC card antenna 14 project from the rear surface of the first chassis 50, it can be anticipated that the contactless IC card antenna 14 may accidentally be hit by some object. However, because the surface of the contactless IC card antenna is formed with a soft material, damages to the contactless IC card antenna 14 can be prevented.

Further, the fact that the telecommunication antenna 62 is provided on the second chassis 60 means that the telecommunication antenna 62 is attached to a chassis different from the first chassis 50. Thus, the distance between the telecommunication antenna 62 and the contactless IC card antenna 14 can be extended, and a communication range for the contactless IC card antenna 14 can be secured.

Also, when the first chassis 50 and the second chassis 60 are folded together, the contactless IC card antenna 14 and the telecommunication antenna 62 become positioned towards diagonally opposing corners. Thus, the distance between the telecommunication antenna 62 and the contactless IC card antenna 14 can be extended, thereby decreasing the effects of mutual interference, and a communication range for the contactless IC card antenna 14 can be secured.

According to an embodiment of the present invention, because the contactless IC card antenna 14 projects from the rear surface of the first chassis 50, even if the first chassis 50 is thin, the distance between the contactless IC card antenna 14 and the metal containing sections can be extended. Thus a communication range for the contactless IC card antenna 14 can be secured.

In explaining the present embodiment, the positioning of the contactless IC card antenna 14 was explained with reference to a mobile phone of a foldable type, but it also applies to non-foldable mobile phones that the telecommunication antenna 62 and the contactless IC card antenna 14 should be distanced as far apart as possible. Therefore, in order to prevent interference between the two antennae, in a non-foldable mobile phone, the telecommunication antenna 62, for example, may be positioned in the upper half of a chassis, while the contactless IC card antenna 14 is positioned in the lower half of the same chassis (not shown in drawing).

It should be understood that the communication module and the communication apparatus of the present invention are not limited to the description of the preferred embodiments herein, inasmuch as the present invention is capable of other embodiments and of being practiced or carried out in various ways, and that they are intended to cover all changes and modifications of the examples of the invention herein chosen for the purposes of the disclosure. Accordingly, any variations, combinations and sub-combinations of the present preferred embodiments should be permitted without departing from the technical scope of the invention.

What is claimed is:

1. A communication module, comprising:
   external communication means for communicating with an external communication object;
   a loop antenna for transmitting to or receiving from said external communication means communication electromagnetic waves corresponding to contents of a communication;
   antenna connection means for connecting said external communication means and said loop antenna; and
   connection means for connecting said communication module with an external apparatus having one or more magnetic field generating components;
   wherein said external communication means, said loop antenna and said antenna connection means are provided on a common mount member, and wherein the external apparatus has a width A and a respective one of the magnetic field generating components has a width B, and wherein a distance between the loop antenna and the respective magnetic field generating component has a value of at least approximately A−B.

2. The communication module according to claim 1, further comprising:
   a shield member for shielding electromagnetic waves.

3. The communication module according to claim 2, wherein said shield member is positioned to face said mount member.

4. A mobile communication terminal apparatus, comprising:
   a telecommunication antenna;
   a display section;
   an ear receiver section for outputting received audio;
   a microphone section for inputting audio to be transmitted; and
   a communication module mountable on and removable from a chassis of said mobile communication terminal apparatus;
   wherein said communication module has external communication means for communicating with external communication objects, a loop antenna for transmitting to or receiving from said communication object communication electromagnetic waves corresponding to contents of a communication by said external communication means, antenna connection means for connecting said external communication means and said loop antenna, connection means for connecting said communication module with at least one of the following: (i) the ear receiver section or (ii) the microphone section, wherein said external communication means, said loop antenna and said antenna connection means are provided on a common mount member, wherein the external apparatus has a width A and one of the ear receiver section or the microphone section has a width B, and wherein a distance between the loon antenna and the respective one of the ear receiver section or the microphone section has a value of at least approximately A−B.

5. The mobile communication terminal apparatus according to claim 4, wherein at least part of said communication module projects from a surface of said mobile communication terminal apparatus.

6. The mobile communication terminal apparatus according to claim 5, wherein a surface of said loop antenna is covered with a soft material.

7. A mobile communication terminal apparatus, comprising:
   a first chassis;
   a second chassis;
   a hinge section for connecting said first chassis and said second chassis so as to be foldable;
   a metal containing section positioned on a surface of said first chassis; and
   a contactless IC card having read and write functions removably coupled to at least one of the first and second chassis to communicate at least one of power, a data signal, and a control signal with the mobile communication terminal and that receives power contactlessly when removed from the mobile communication terminal; and
   a contactless IC card antenna, at least partly projecting from a rear surface of said first chassis, for transmitting data processed by said contactless IC card and receiving data to be processed by said contactless IC card;
   wherein the mobile communication terminal apparatus has a width A and the metal containing section has a width B, and wherein a distance between the contactless IC card antenna and the metal containing section has a value of at least approximately A−B.

8. The mobile communication terminal apparatus according to claim 7, wherein a surface of said contactless IC card antenna is formed with a soft material.

9. The mobile communication terminal apparatus according to claim 7, further comprising:
   a telecommunication antenna for communication over ranges more distant than that of said contactless IC card antenna;
   wherein said telecommunication antenna is attached to said second chassis, and said contactless IC card antenna is attached to said first chassis.

10. The mobile communication terminal apparatus according to claim 9, wherein said contactless IC card antenna is positioned on an end opposite to an end on which said hinge section is provided, and wherein said telecommunication antenna is positioned close to said hinge section, and wherein when said first chassis and said second chassis are folded together, said contactless IC card antenna and said telecommunication antenna become positioned towards diagonally opposing corners of a profile of said mobile communication terminal apparatus.

* * * * *